United States Patent [19]

Rorer et al.

[11] 4,455,357

[45] Jun. 19, 1984

[54] HOUSING ASSEMBLY FOR AIRCRAFT BATTERIES

[75] Inventors: David L. Rorer; John E. James, both of Redlands, Calif.

[73] Assignee: Teledyne Industries, Inc., Los Angeles, Calif.

[21] Appl. No.: 492,956

[22] Filed: May 9, 1983

[51] Int. Cl.³ .............................................. H01M 2/02
[52] U.S. Cl. .................................... 429/179; 29/623.1
[58] Field of Search ....................... 429/179, 178, 181; 29/623.1

[56] References Cited

U.S. PATENT DOCUMENTS 4,317,871 3/1982 Wolf et al. ........................... 429/179
4,337,301 6/1982 Rorer et al. ..................... 429/184 X Primary Examiner—Charles F. LeFevour
Attorney, Agent, or Firm—Reagin & King

[57] ABSTRACT

An improved housing assembly for aircraft batteries is disclosed in which an insulated bezel is fastened to a cast aluminum housing using the battery electrical terminals. The bezel serves both to isolate the terminals from the housing and to provide a locating frame for a terminal enclosure. Recessed threaded inserts are used to fasten the terminal enclosure.

3 Claims, 9 Drawing Figures

HOUSING ASSEMBLY FOR AIRCRAFT BATTERIES

BACKGROUND OF THE INVENTION

This invention relates to aircraft batteries, and more particularly to an improved housing assembly for aircraft batteries.

In prior art aircraft batteries, conventionally a cast aluminum housing is employed which contains the battery cells and which also supports the battery electrical terminals. Over the years, a large number of battery terminal configurations have evolved which employ different types of terminals as well as different terminal spacings.

In the construction of prior art aircraft batteries, each terminal configuration generally necessitates the use of a cast aluminum battery housing uniquely designed to accommodate that specific configuration. Accordingly, a large number of housings and housing molds have to be inventoried by battery manufacturers.

It is an object of the present invention to provide a new and improved housing for aircraft batteries.

It is another object of the present invention to provide a housing adaptable for use with a plurality of battery terminal configurations.

SUMMARY OF THE INVENTION

The foregoing and other objects of the invention are accomplished by providing a housing assembly including a generally rectangular metal case having terminal openings in one side thereof through which threaded ends of the battery terminals extend.

A generally rectangular bezel formed of an insulating material is provided having cylindrical bosses which project from a first side and which surround holes through the bezel which correspond in spacing to the terminal openings in the case. A wall forming a frame projects from a second side of the bezel. The bezel is designed so that the cylindrical bosses slip over the battery terminals and through the terminal openings in the case to form insulated bushings for the terminals when the bezel is placed adjacent the one side of the case.

The frame portion of the bezel is designed to fit around and locate one end of a terminal enclosure which is positioned over the bezel. The terminal enclosure is held in place using threaded inserts which are fitted into openings provided in the case. One end of a threaded rod is inserted through a respective opening in the bezel and into a respective threaded insert. The other end of each rod passes through the terminal enclosure. A threaded fastener is attached to the free end of each rod and tightened against the enclosure to hold it in place.

Other objects, features and advantages of the invention will become apparent from a reading of the specification when taken in conjunction with the drawings in which like reference numerals refer to like elements in the several views.

DESCRIPTION OF THE PRIOR ART

Figure 1:
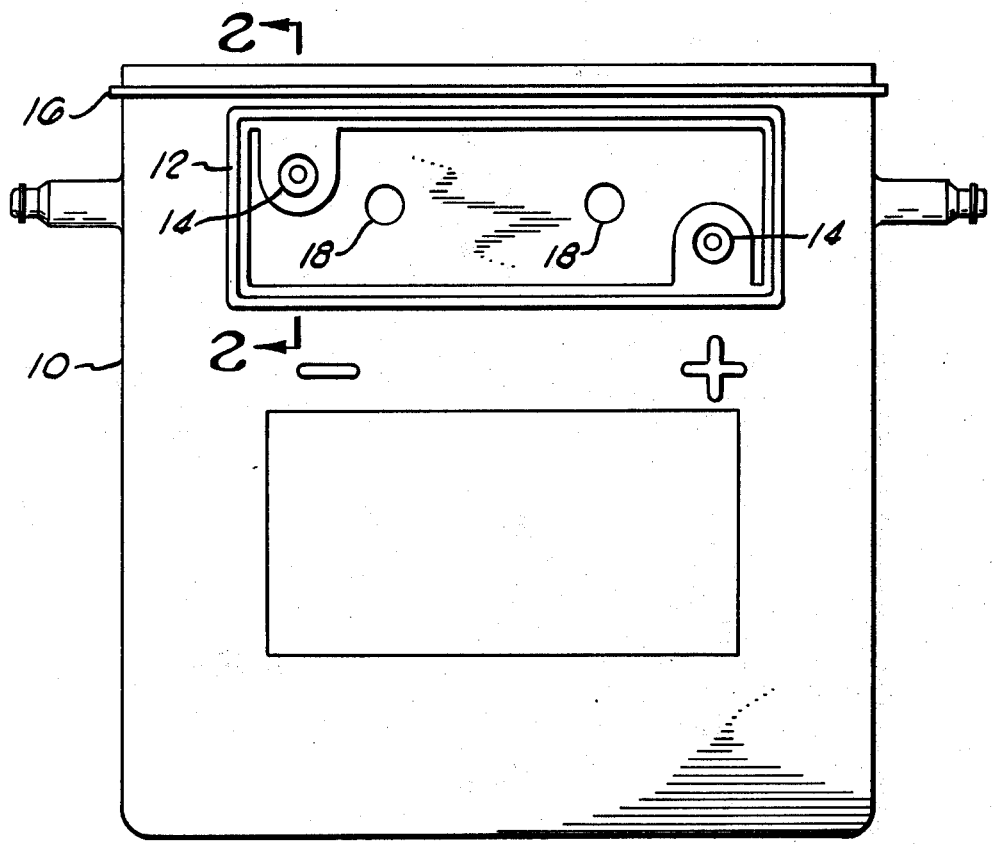
FIG. 1 is a side view of a prior art aircraft battery housing.
Figure 2:
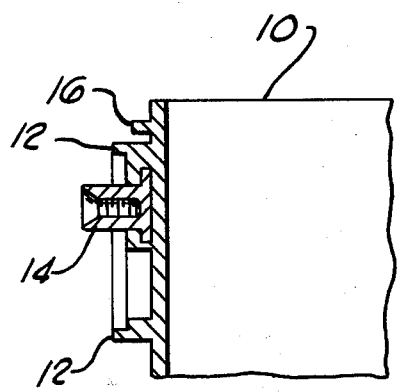
FIG. 2 is a cross sectional view of a portion of the housing of FIG. 1, taken along the line 2—2 of FIG. 1.

Referring to FIGS. 1 and 2, there are shown side and cross sectional views of a prior art aircraft battery housing 10 designed to accommodate one of the more popular battery terminal configurations. The housing 10 is typically fabricated of cast aluminum with a raised wall 12 in the form of a frame being integrally cast as part of one side thereof. Threaded inserts 14 are also cast into the one side of the housing 10 within the frame 12, and a projecting lip 16 is provided around the periphery at the top of the housing 10.

The prior art housing 10 just described is designed to accommodate battery electrical terminals in the form of threaded studs (not shown) which project outward through openings 18 provided in the housing 10. Insulated shoulder washers are used to isolate the terminals from the metal housing 10. The frame 12 is used to locate and support a terminal enclosure (not shown) which fits over the terminals. Bolts are used in conjunction with the threaded inserts 14 to hold the enclosure in place. The lip 16 serves as a support for a cover (not shown) which is fitted over the top of the housing 10.

While the housing 10 is suitable for use with the terminal configuration just described, in general, it cannot be used with any other terminal configuration. For example, the projecting inserts 14 and the frame 12 preclude the use of many flush-mounted connector-type terminal configurations with the housing 10. Further, any changes to the location of the inserts 14 or the frame 12 generally require the construction of a new casting mold, which is an expensive and time consuming process.

DESCRIPTION OF THE PREFERRED EMBODIMENT

Figure 3:
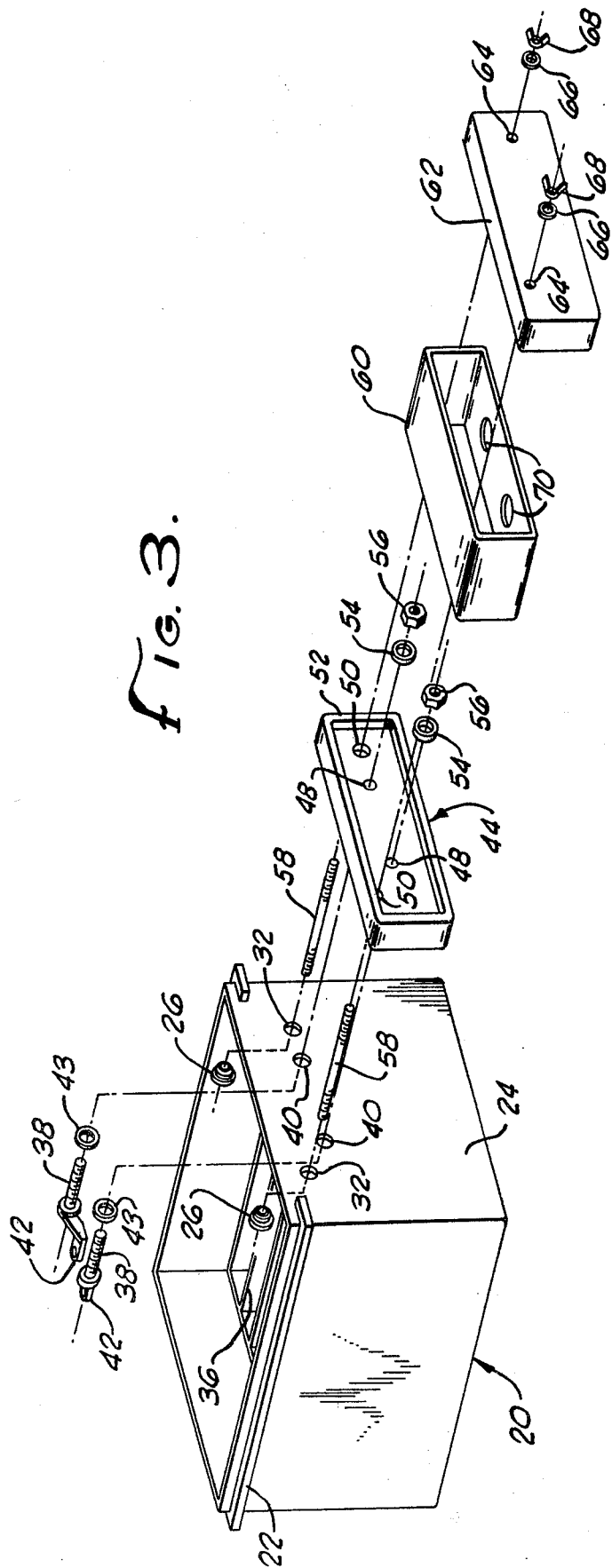
FIG. 3 is an exploded perspective view of the housing assembly constructed according to the present invention.
Figure 8:
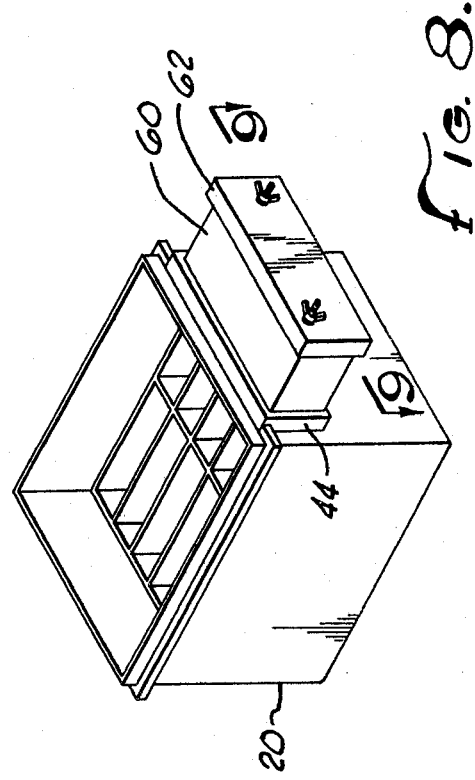
FIG. 8 is a perspective view of the housing assembly of FIG. 3 in its fully assembled form.
Figure 9:
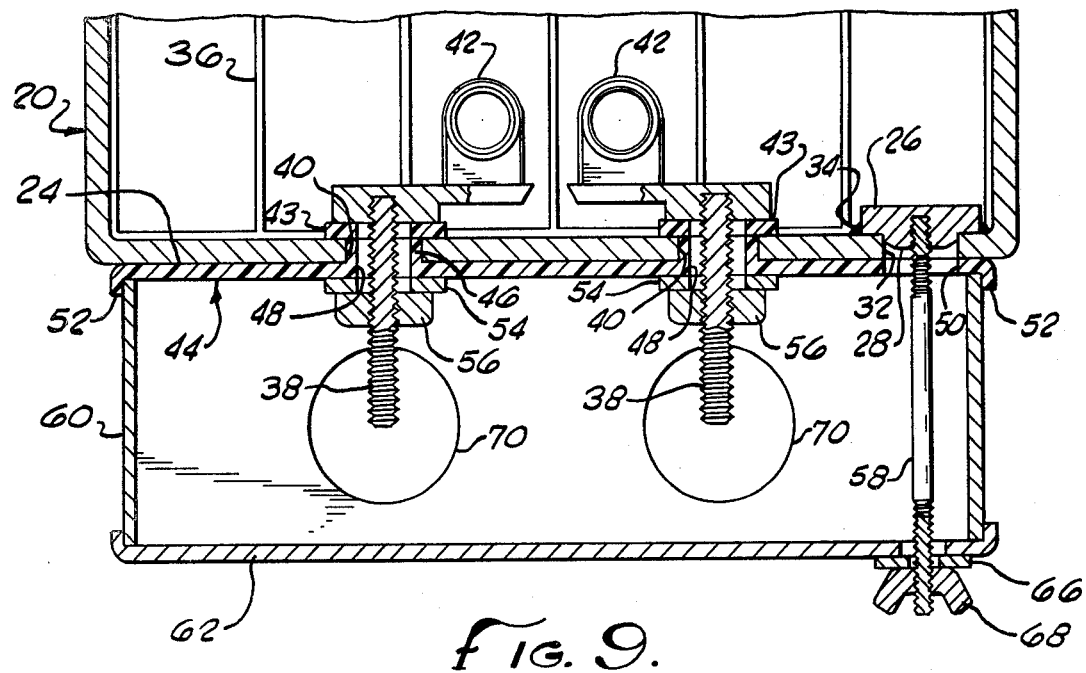
FIG. 9 is a cross sectional view of a portion of the assembled housing of FIG. 8 taken generally along the line 9—9 of FIG. 8.

Referring now to FIGS. 3, 8 and 9, there are shown an exploded perspective view, an assembled view and a cross sectional view, respectively, of an aircraft battery housing assembly constructed in accordance with the invention. A housing 20 is provided which may be cast of aluminum or other suitable material. A lip 22 is provided around the upper edge of the housing 20, but is interrupted over a portion of the length of a first side 24 used to support the battery terminals.

Figure 5:
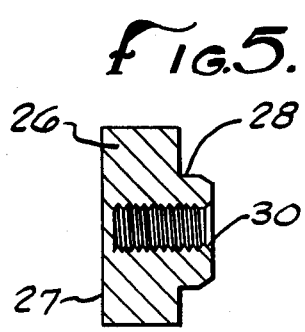
FIG. 5 is a cross sectional view of the insert of FIG. 4, taken along the line 5—5 of FIG. 4.
Figure 4:
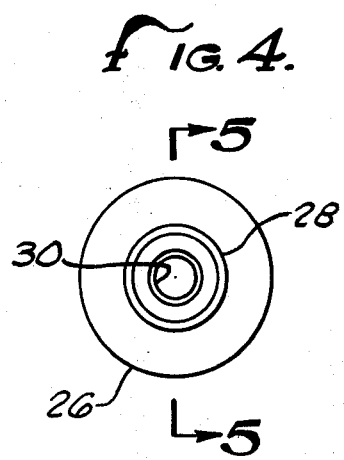
FIG. 4 is a front view of a threaded insert used in the construction of the housing assembly of FIG. 1.

Two inserts 26 are provided which are generally circular in construction, have a closed end 27 and include a blind threaded hole, as shown in FIGS. 4 and 5. A reduced diameter portion 28 is formed adjacent threaded opening 30. The reduced diameter portion 28 of each insert 26 is pressed into a perspective opening 32 provided in the side 24 of the housing 20. The opening 32 is smaller in diameter than the closed end 27 of the insert 26. As shown in FIG. 9, the portion 28 does not project beyond the outer surface of the side 24. A sealant 34 such as epoxy may be applied to the joint between the insert 26 and the side 24 to form a gas tight seal.

After aircraft battery cells 36 are installed within the housing 20, electrical terminals 38 in the form of threaded studs are fitted through openings 40 provided in the side 24. The rear end of each terminal 38 is in the form of an L-shaped lug 42 used to connect the terminal 38 to a respective battery cell. An insulated flat washer 43 is positioned between each lug 42 and the inside surface of the side 24.

Figure 6:
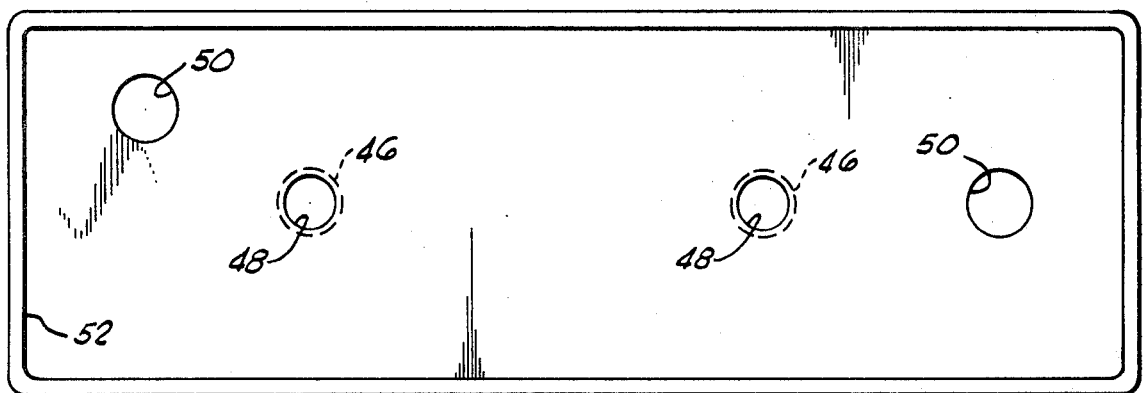
FIG. 6 is a side view of a bezel used in the construction of the housing assembly of FIG. 1.
Figure 7:
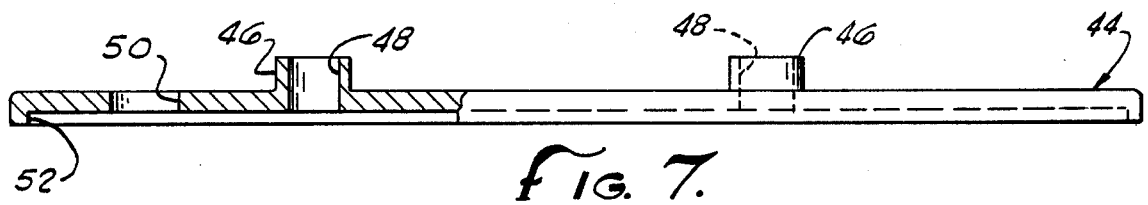
FIG. 7 is an end view, partially in cross section, of the bezel of FIG. 6.

A generally rectangular bezel 44 formed of an insulating material such as plastic is also provided. As shown in FIGS. 6 and 7, cylindrical bosses 46 extend from one side of the bezel 44, where each boss 46 surrounds a respective opening 48. The spacing between openings 48 corresponds to the spacing between openings 40 in the housing 20. Openings 50 are also provided in the bezel 44, where the spacing between the openings 50 corresponds to the spacing between the openings 32 in the housing 20. A wall 52 projects from a second side of the bezel 44 and forms a frame around the periphery thereof.

The bezel 44 is positioned against the side 24 of the housing 20 by sliding the bosses 46 over the terminals 38 and through the openings 40. The bosses 46 thus serve as insulated bushings to isolate the terminals 38 from the housing 20, as shown in FIG. 9. The bezel 44 is held in place using washers 54 and nuts 56. The nuts 56 are threaded onto the respective terminals 42 and tightened to hold the bezel 44 in place.

Cylindrical rods 58 are provided which are threaded on both ends. One end of each rod 58 passes through a respective opening 50 in the bezel 44 and is threaded into a respective insert 26.

A box-shaped terminal enclosure 60 having open ends is provided which is shaped to fit just within the frame 52 of the bezel 44. A cover 62 is provided for the enclosure 60 where the cover 62 includes openings 64 which correspond in spacing to the openings 32 in the housing 20. One end of the enclosure 60 is positioned within the frame 52 which both locates and supports the enclosure 60. The cover 62 is placed over the other end of the enclosure 60, whereby the free ends of the rods pass through respective openings 64. Washers 66 and wingnuts 68 are used in conjunction with rods 58 to tighten the enclosure 60 and the cover 62 in place, as shown in FIG. 9. Openings 70 are provided in one side of the enclosure 60 to provide access for battery cables (not shown).

In an alternate embodiment, the enclosure 60 and the cover 62 may be combined into a single part by, for example, providing a molded enclosure having a closed end which includes the openings 64.

From the above description of the housing assembly of the present invention, it may be seen that the assembly is easily adaptable to a variety of mounting configurations without the need to change the cast configuration of the housing 20. For example, the position of the openings 40 and 32 may be easily changed since these openings are formed by punching or drilling operations after the housing is cast. Further, the size and shape of the bezel 44 may be easily changed by molding a new bezel, which is significantly less expensive than casting a new housing.

Another feature of the present invention is that the housing 20 may be used with a variety of connector-type terminal configurations simply by removing the bezel 44 and enclosure 60. In particular, the recessed inserts 26 permit the housing 20 to be used with a terminal connector commonly referred to as a Cannon receptacle, without the need to modify the housing 20. Interrupting the cover lip 22 in the area adjacent the terminals enables the housing 20 to be adapted for use with terminal configurations which would normally interfere with the lip 22 in this area.

While the invention is disclosed and a particular embodiment is described in detail, it is not intended that the invention be limited solely to this embodiment. Many modifications will occur to those skilled in the art which are within the spirit and scope of the invention. It is thus intended that the invention be limited in scope only by the appended claims.

What is claimed is:

1. In a housing assembly for containing an aircraft battery and for supporting the battery electrical terminals, including a generally rectangular metal case having terminal openings in one side thereof through which the battery terminals extend, and a terminal enclosure which mounts to the one side of the case and encloses the battery terminals, the improvement comprising:
    a generally rectangular bezel formed of an insulating material having cylindrical bosses which project from a first side of the bezel and which surround holes through the bezel which correspond in spacing to the terminal openings in the case, and further having a wall forming a frame around the cylindrical bosses which projects from a second side of the bezel opposite the first side, where the frame is designed to fit around and locate one end of the terminal enclosure, and where the cylindrical bosses are designed to slip over the battery terminals and through the terminal openings in the case to form insulated bushings when the first side of the bezel is placed adjacent the one side of the case;
    first fastening means acting in cooperation with the battery terminals to fasten the bezel to the one side of the case; and
    second fastening means attached to the case for fastening the terminal enclosure to the second side of the bezel.

2. The improvement of claim 1 in which the second fastening means includes generally cylindrical threaded inserts, each closed at one end and having a reduced diameter threaded open end which is fitted into an insert opening provided in the one side of the case, where the insert opening is smaller in diameter than the closed end of the insert; and rods, each threaded at both ends, where one end of each rod extends through a respective opening provided in the bezel and is threaded into the open end of a respective threaded insert, and where the other end of each rod passes through the terminal enclosure and is fitted with a nut which may be tightened against the enclosure to hold it in place against the second side of the bezel.

3. A method of making a housing assembly for containing an aircraft battery and for supporting the battery electrical terminals, comprising the steps of:
    providing a generally rectangular metal case sized to contain the battery cells;
    forming terminal openings and insert openings in one side of the case;

providing generally cylindrical threaded inserts, each closed at one end and having a reduced diameter threaded open end;

fitting the open end of each threaded insert into a respective insert opening so that the open end faces the exterior of the case;

extending threaded portions of the battery terminals through the terminal openings;

providing a generally rectangular bezel formed of an insulating material having cylindrical bosses which project from a first side of the bezel and surround terminal clearance holes through the bezel which correspond in spacing to the terminal openings in the case, having insert clearance holes through the bezel which correspond in spacing to the insert openings in the case, and further having a wall forming a frame which projects from a second side of the bezel opposite the first side;

positioning the first side of the bezel adjacent the one side of the case so that the cylindrical bosses slip over the threaded portions of the battery terminals and through the terminal openings in the case, thus forming insulated bushings for the terminals;

providing threaded terminal fasteners;

installing a threaded terminal fastener over the end of each terminal and tightening each fastener to hold the bezel against the one side of the case;

providing rods threaded at both ends;

inserting one end of each rod through a respective insert clearance hole and threading it into a respective insert;

providing a generally rectangular terminal enclosure having a first end sized to fit within the frame;

positioning the first end of the enclosure over the battery terminals and the rods and within the frame of the bezel, whereby the frame acts to locate the enclosure and the other end of each rod extends through openings in the enclosure;

providing threaded fasteners; and installing a threaded fastener over the other end of each rod and tightening each fastener against the enclosure to hold it in place against the bezel.

* * * * *